United States Patent [19]

Rippel

[11] Patent Number: 4,874,681
[45] Date of Patent: Oct. 17, 1989

[54] WOVEN-GRID SEALED QUASI-BIPOLAR LEAD-ACID BATTERY CONSTRUCTION AND FABRICATING METHOD

[76] Inventor: Wally E. Rippel, 3308 Alegre La., Altadena, Calif. 91001

[21] Appl. No.: 181,745

[22] Filed: Apr. 14, 1988

[51] Int. Cl.$^4$ ............................................. H01M 10/18
[52] U.S. Cl. ..................................... 429/210; 429/225; 429/234; 429/245
[58] Field of Search ............... 429/210, 149, 152, 185, 429/234, 241, 225, 245

[56] References Cited

U.S. PATENT DOCUMENTS

| | | | |
|---|---|---|---|
| 3,141,795 | 7/1964 | Eisler | 136/6 |
| 3,267,190 | 8/1966 | Malloy | 264/137 |
| 3,390,014 | 6/1968 | Eisler | 136/6 |
| 4,121,023 | 10/1978 | Parkinson et al. | 429/211 |
| 4,144,115 | 3/1979 | Sundberg | 156/161 |
| 4,202,936 | 5/1980 | Guimond et al. | 429/163 |
| 4,211,833 | 7/1960 | Einstein | 429/210 X |
| 4,275,130 | 6/1981 | Rippel et al. | 429/144 |
| 4,331,747 | 5/1982 | Julian et al. | 429/160 |
| 4,351,891 | 9/1982 | McCartney, Jr. et al. | 429/225 |
| 4,353,969 | 10/1982 | Rippel et al. | 429/144 |
| 4,476,206 | 10/1984 | Viala et al. | 429/234 |
| 4,537,842 | 8/1985 | Sundberg | 429/140 |
| 4,572,879 | 2/1986 | Morioka | 429/94 |
| 4,603,093 | 7/1986 | Edwards et al. | 429/54 |
| 4,658,623 | 4/1987 | Blanyer et al. | 72/268 |
| 4,664,992 | 5/1987 | Edwards et al. | 429/144 |

Primary Examiner—Anthony Skapars
Attorney, Agent, or Firm—Marvin E. Jacobs

[57] ABSTRACT

A quasi-bipolar lead-acid battery construction includes a plurality of bipolar cells disposed in side-by-side relation to form a stack, and a pair of monoplanar plates at opposite ends of the stack, the cell stack and monopolar plates being contained within a housing of the battery. Each bipolar cell is loaded with an electrolyte and composed of a bipolar electrode plate and a pair of separator plates disposed on opposite sides of the electrode plate and peripherally sealed thereto. Each bipolar electrode plate is composed of a partition sheet and two bipolar electrode elements folded into a hairpin configuration and applied over opposite edges of the partition sheet so as to cover the opposite surfaces of the opposite halves thereof. Each bipolar electrode element is comprised of a woven grid with a hot-melt strip applied to a central longitudinal region of the grid along which the grid is folded into the hairpin configuration, and layers of negative and positive active material pastes applied to opposite halves of the grid on opposite sides of the central hot-melt strip. The grid is made up of strands of conductive and non-conductive yarns composing the respective transverse and longitudinal weaves of the grid. The conductive yarn has a multi-stranded glass core surrounded and covered by a lead sheath, whereas the non-conductive yarn has a multi-stranded glass core surrounded and covered by a thermally activated sizing.

22 Claims, 8 Drawing Sheets

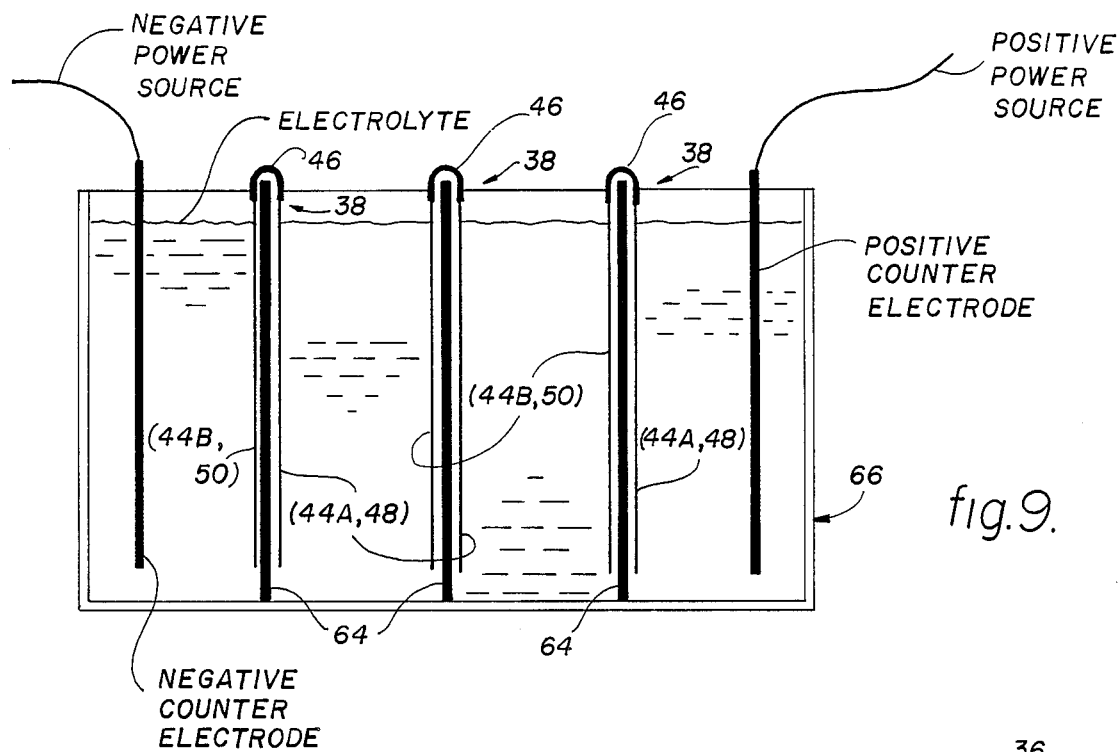
fig.9.
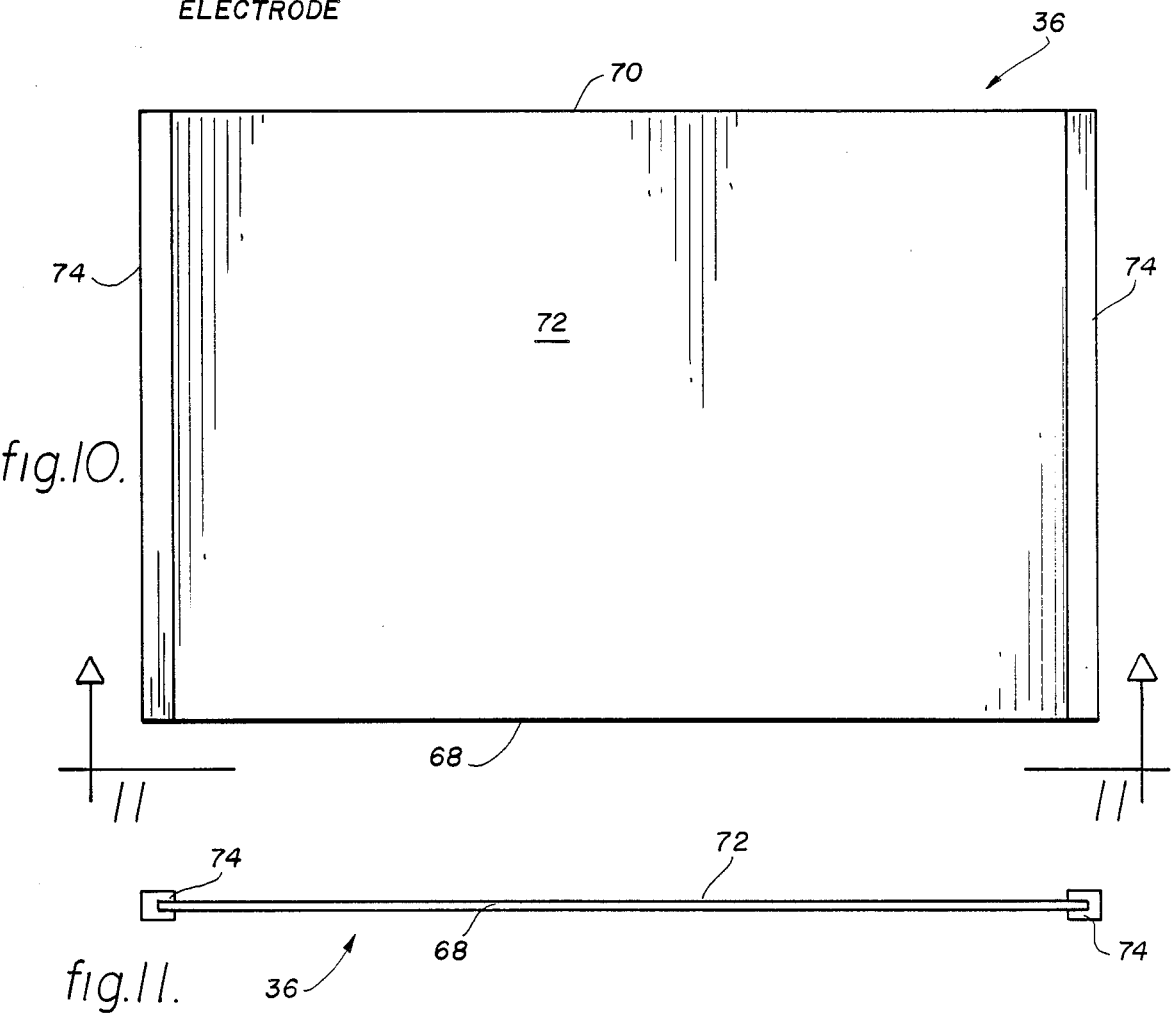
fig.10.
fig.11.

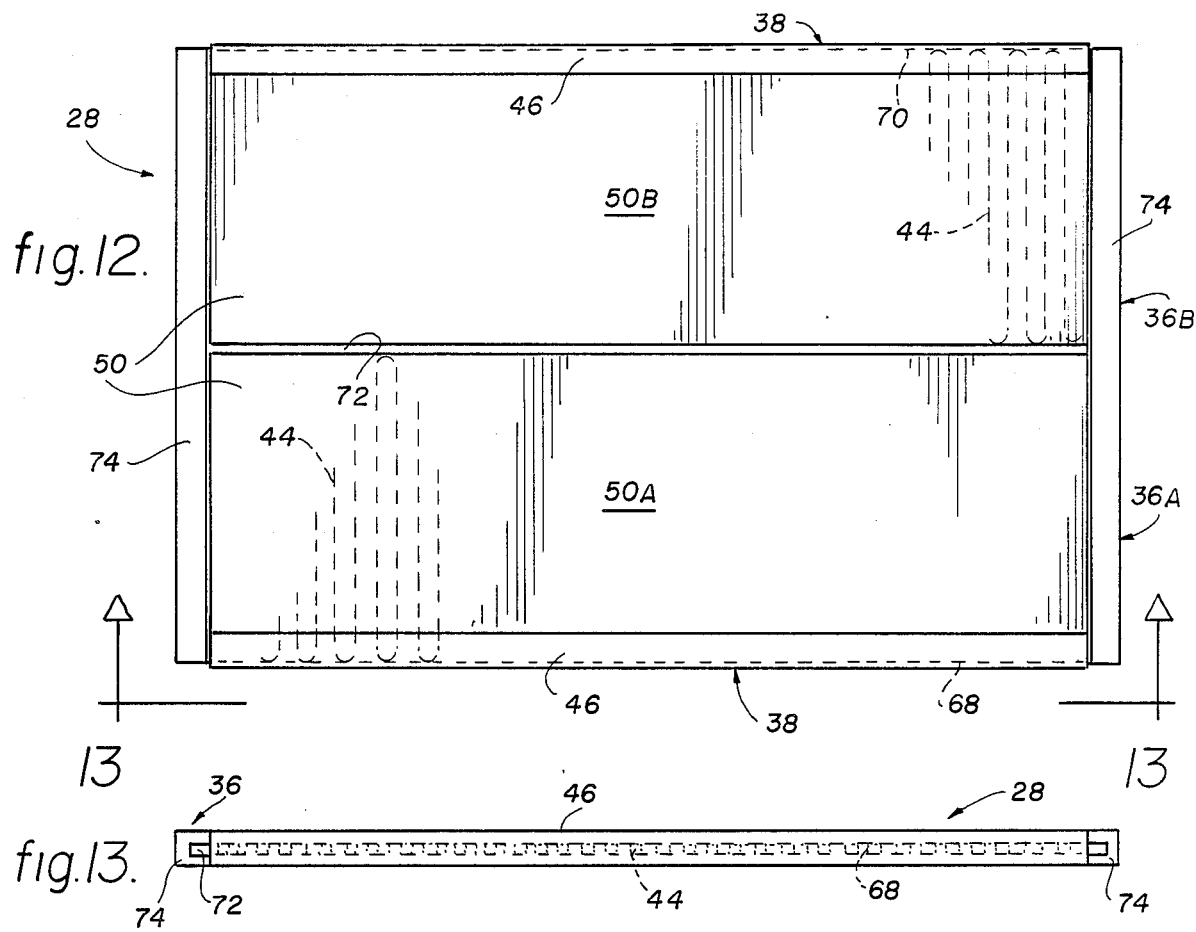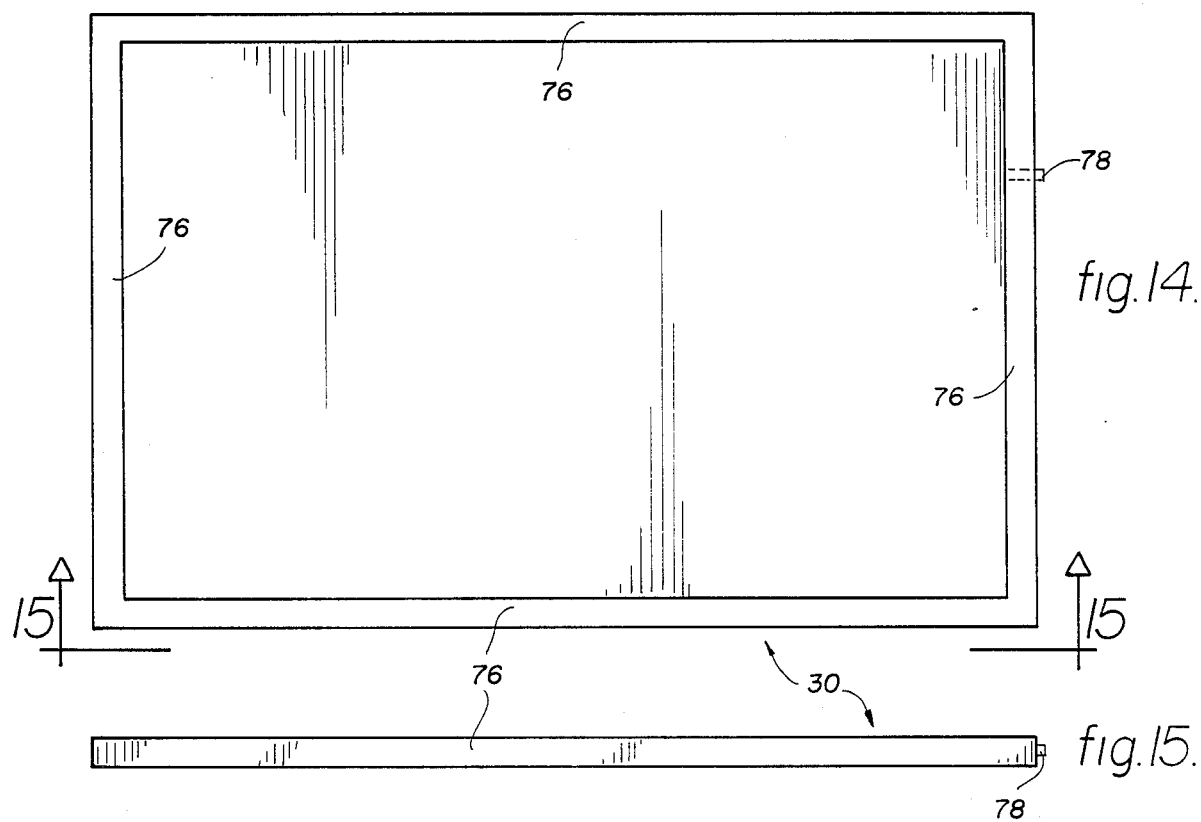

WOVEN-GRID SEALED QUASI-BIPOLAR LEAD-ACID BATTERY CONSTRUCTION AND FABRICATING METHOD

ORIGIN OF INVENTION

The invention described herein was made in the performance of work under a NASA contract, and is subject to the provisions of Public Law 96-517 (35 USC 202) in which the Contractor has elected to retain title.

BACKGROUND OF THE INVENTION

The present invention generally relates to lead-acid storage batteries and, more particularly, to a woven-grid, sealed, quasi-bipolar lead-acid battery construction and fabricating method.

A conventional bipolar battery generally includes electrodes having a metallic substrate on which positive active material forms one surface and negative active material forms the opposite surface. The active materials are retained by various means on the metal conductive substrate which is impermeable to electrolyte ions. The electrodes are arranged in parallel, stacked relation to provide a multicell battery with electrolyte and separator plates providing an interface between adjacent electrodes. Conventional monopolar electrodes, used at the ends of the stack are electrically connected with the output terminals. While achieving respectable power densities, these conventional bipolar battery designs suffer substrate corrosion, seal and active material retention problems. For these reasons, bipolar versions of the standard lead-acid battery have failed to gain commercial success.

Two recent battery constructions have been proposed which avoid many disadvantages of prior bipolar battery constructions. One construction is the improved lightweight bipolar battery disclosed in U.S. Pat. No. 4,275,130 to Rippel et al and assigned to the assignee herein. The improved bipolar battery construction has a plurality of spaced thin biplates each being of composite thermoplastic material with conductive fibers such as carbon, graphite or metallic fibers serving as strengthening and conductive elements. Also, each biplate has spaced lead stripes on opposite side surfaces in bonded electrical contact with the graphite fibers, with non-striped areas being provided with protective coating. A plurality of thin separator plates of thermoplastic material are interleaved with the biplates, each separator plate having bonded thereto porous resiliently yieldable mats serving to carry active material. Each biplate is bonded to a casing member which, in turn, is bonded to adjacent casing members. The interleaved biplates and separator plates are held in a stack under compression and maintained in operable assembly with the active material in contact with the lead stripes by external pressure means.

The other construction is the improved light-weight quasi-bipolar battery disclosed in U.S. Pat. No. 4,353,969 to Rippel et al and assigned to the assignee herein. (The term "quasi-bipolar" is used to mean that the biplate structure of this construction, unlike in most prior bipolar battery constructions, does not conduct electrical current through the material of the biplate structure.) The improved quasi-bipolar battery of the cited patent employs a frameless, flexible biplate construction. It utilizes a continuous strip of thermoplastic material folded into pleated biplate walls and sealed along longitudinal edge portions thereof to provide sealed chambers adapted to receive separator plates and to contain electrolyte liquid. The continuous thermoplastic strip serves not only to provide the biplate structures but also the battery casing structure. Each separator plate includes a scrim fabric means for holding active material and attached by bonding to a porous mat carried by a micro-porous separator substrate. The scrim fabric means and porous mats contain electrolyte liquid. The top opening of each chamber can be covered and sealed by a top seal member of thermoplastic material bonded to the biplate structure.

These two recent battery constructions of the above-cited patents avoid many of the disadvantages of prior bipolar battery constructions, such as excess weight, sealing and corrosion problems, off gassing, limited energy and power densities and reduced cycling life. Further, these constructions are useful for virtually all battery applications and particularly for electrical vehicles in which the ratio of energy and power to battery weight is critical for the distance range, speed, and acceleration of the electrical vehicle.

Notwithstanding the advantages and benefits believed to be achieved by the above-described recent battery constructions, a need continues for a quasi-bipolar, lead-acid battery construction having improved weight-to-power ratio, maintenance free operation, high specific energy, vibration and g-force resistance, long life expectancy and many other design parameter improvements.

SUMMARY OF INVENTION

The present invention provides improvements in a quasi-bipolar, lead-acid battery construction and fabricating method designed to satisfy the aforementioned needs. Particularly, the invention relates to improvements in the constructions of the bipolar cells of the battery, the bipolar electrode plate of each bipolar cell and the bipolar electrode elements of each bipolar electrode plate and the woven grid of each bipolar electrode element. The quasi-bipolar battery construction of the present invention utilizes woven, lead-coated, fiberglass yarn to achieve current distribution and active material reinforcement. Performance features include high specific energy and power combined with rugged, long life, maintenance-free operation in a high voltage configuration. Production features include the exclusive use of available, low-cost materials and standard lead-acid production methods.

Accordingly, the present invention is directed to a bipolar battery construction, wherein the combination comprises: (a) a plurality of bipolar cells disposed in side-by-side relation to form a stack of the cells; (b) each bipolar cell being loaded with an electrolyte and composed of a bipolar electrode plate and a pair of separator plates disposed on opposite sides of the electrode plate and peripherally sealed thereto; and (c) each bipolar electrode plate being composed of a partition sheet and a pair of bipolar electrode elements folded into a hairpin configuration and applied over opposite edges of the partition sheet so as to cover opposite surfaces of adjacent halves of the partition sheet. Additionally, the bipolar battery construction includes a pair of monopolar plates disposed at opposite ends of the stack of bipolar cells, and a housing having a case and a lid sealing the case, with the housing containing the bipolar cell stack and the monopolar plates disposed at the stack opposite ends.

Also, the present invention is directed to the bipolar cell and the bipolar electrode plate constructions used in the battery and as defined above. Further, the present invention is directed to the bipolar electrode element construction used in the battery which comprises: (a) a woven grid; (b) a hot-melt strip applied to a central longitudinal region of the woven grid along which the grid is folded into the hairpin configuration; and (c) layers of negative and positive active material pastes applied to respective halves of the woven grid on opposite sides of the central hot-melt strip.

Also, the present invention is directed to the construction of the woven grid used in the bipolar electrode element. The woven grid comprises: (a) strands of a conductive yarn composing the transverse weaves of the grid; and (b) strands of either conductive or non-conductive yarn composing the longitudinal weaves of the grid. The conductive yarn has a multi-stranded glass core surrounded and covered by a lead sheath, whereas the non-conductive yarn has a multi-stranded glass core surrounded and covered by a sizing.

Still further, the present invention is directed to a method of fabricating a quasi-bipolar battery, which comprises the steps of (a) applying an adhesive strip to a central longitudinal region of a grid woven from strands of conductive and non-conductive yarns composing respective transverse and longitudinal weaves of the grid; (b) applying layers of negative and positive active material pastes to respective halves of the grid on opposite sides of the central hot-melt strip; (c) folding the grid along the central strip into a hairpin configuration to form a bipolar electrode element; (d) applying a pair of the bipolar electrode elements over opposite edges of a partition sheet so as to cover opposite surfaces of adjacent halves of the sheet and thereby form a bipolar electrode plate; (e) applying and peripherally sealing a pair of separator plates to opposite sides of the bipolar electrode plate to thereby form a bipolar cell; (f) loading a plurality of the bipolar cells with an electrolyte; (g) placing the cells in a stack thereof; (h) applying a pair of monopolar plates at opposite ends of the stack of bipolar cells; and (i) enclosing the bipolar cell stack and pair of monopolar plates in a battery case.

Also, the present invention is directed to methods of fabricating the bipolar electrode element, the bipolar electrode plate, and the bipolar cell used in the battery and as defined above in the steps of the quasi-bipolar battery fabricating method.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

FIG. 9 is a vertical sectional view of a bipolar formation tank illustrating a plurality of bipolar electrode elements folded into a hairpin configuration along their central hot-melt strips and hung over partitions in the tank containing a forming acid.

FIG. 10 is a plan view of a partition sheet employed in the battery construction of FIG. 1, the partition sheet having strips of hot-melt adhesive molded over opposite side edges thereof.

FIG. 11 is a bottom end view of the partition sheet as seen along line 11—11 of FIG. 10.

FIG. 12 is a plan view of a bipolar electrode plate employed in the battery construction of FIG. 1, the electrode plate being composed of the partition sheet of FIG. 10 and two cured and formed bipolar electrode elements applied over opposite upper and lower edges of the partition sheet so as to cover the opposite surfaces of the upper and lower halves thereof.

FIG. 13 is a bottom end view of the electrode plate as seen along line 13—13 of FIG. 12.

FIG. 14 is a plan view of a separator plate employed in the battery construction of FIG. 1, the separator plate having borders impregnated with hot-melt adhesive and a gas vent tube extending from within one border to allow gas venting.

FIG. 15 is a bottom end view of the separator plate as seen along line 15—15 of FIG. 14.

DETAILED DESCRIPTION OF THE INVENTION

IMPROVED CONSTRUCTIONS OF QUASI-BIPOLAR BATTERY AND COMPONENTS THEREOF.

Figure 1:
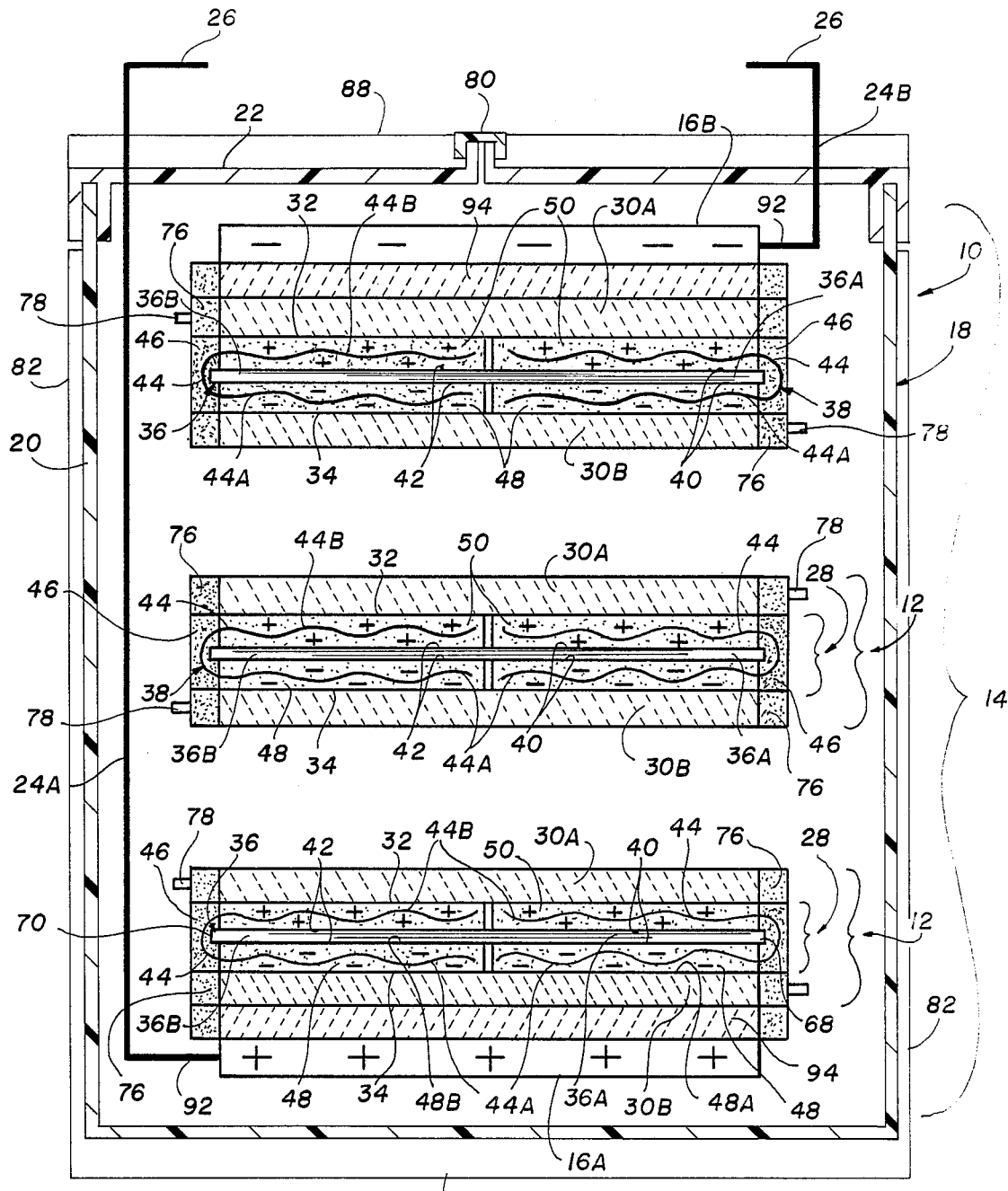
FIG. 1 is a vertical sectional view of a quasi-bipolar battery construction in accordance with the principles of the present invention.
Figure 2:
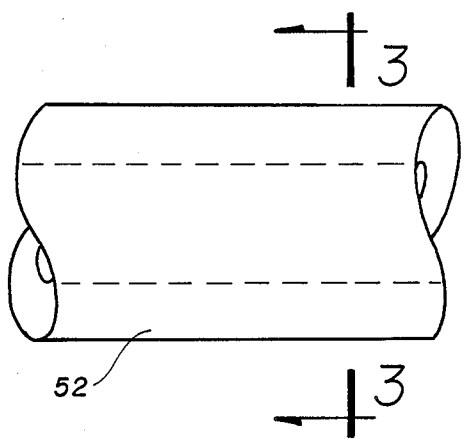
FIG. 2 is an enlarged fragmentary view of a conductive transverse strand of the continuous woven grid of FIG. 6.
Figure 3:
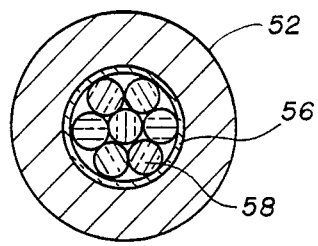
FIG. 3 is a cross-sectional view of the transverse strand taken along line 3—3 of FIG. 2.
Figure 4:
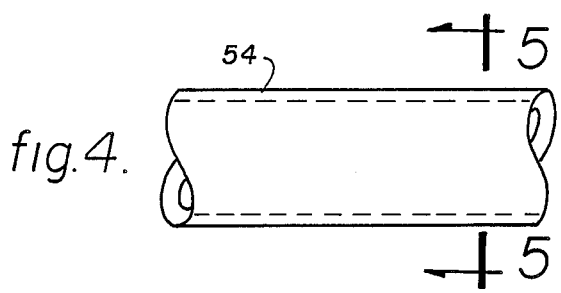
FIG. 4 is an enlarged fragmentary view of a nonconductive longitudinal strand of the continuous woven grid of FIG. 6.
Figure 5:
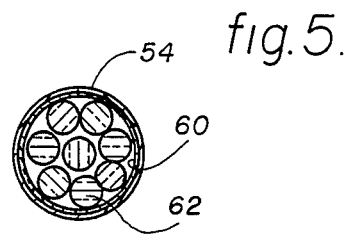
FIG. 5 is a cross-sectional view of the longitudinal strand taken along line 5—5 of FIG. 4.
Figure 6:
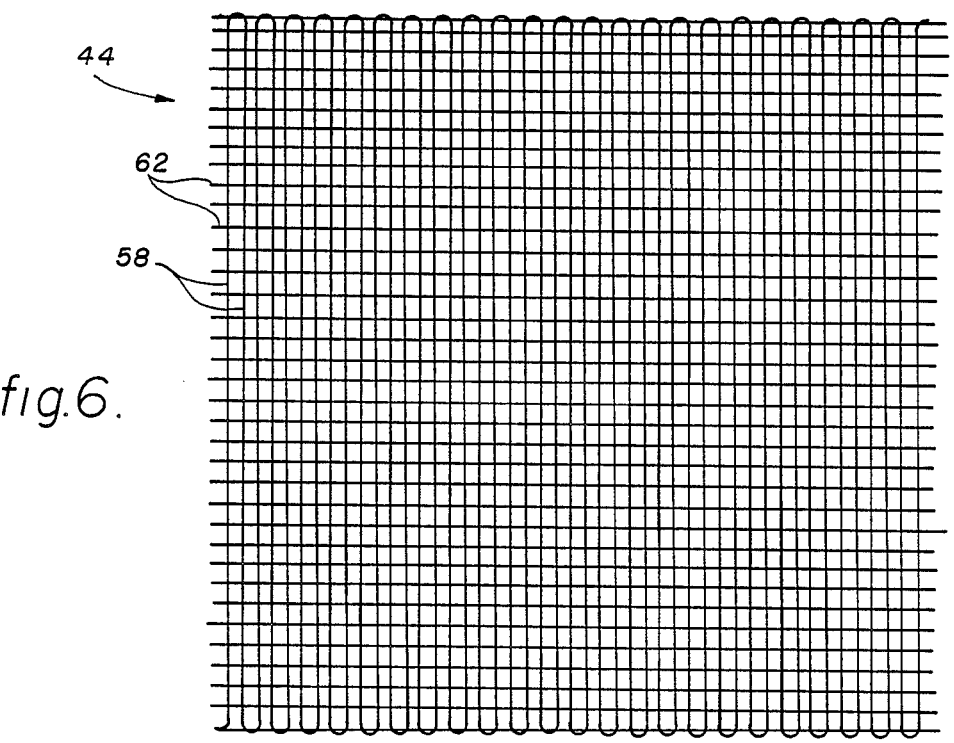
FIG. 6 is a plan view of a continuous woven grid employed in the battery construction of FIG. 1, the woven grid utilizing the respective strands of FIGS. 2 and 4 as the transverse and longitudinal weaves.

Referring now to the drawings, and particularly to FIG. 1, there is shown the construction of a woven-grid, sealed, quasi-bipolar lead-acid battery generally designated by the numeral 10, embodying the principles of the present invention. The quasi-bipolar battery 10 basically includes a plurality of bipolar cells 12 (see also FIGS. 16 and 17) disposed in side-by-side contacting relation, one above the next, to form a stack 14 of the cells 12, and a pair of conventional monopolar end plates 16 disposed at opposite ends of the stack 14 of bipolar cells 12. (The gap shown in FIG. 1 between the upper two bipolar cells 12 would not be present in an actual battery.) Also, the battery 10 includes a housing 18 (see also FIGS. 18 and 19) having a case 20 and a lid 22 sealing the case 20. The housing 18 contains the bipolar cell stack 14 and the monopolar plates 16 disposed at the stack opposite ends, and a pair of lead buses 24 which connect the end plates 16 to external connectors 26 mounted on the lid 22 of the battery housing 18.

More particularly, each bipolar cell 12 (see also Figs. 16 and 17) used in the battery 10 is loaded with an electrolyte, in a manner to be described later, and composed of a bipolar electrode plate 28 and a pair of glass mat separator plates 30 (see also FIGS. 14 and 15) disposed on opposite sides 32, 34 of the electrode plate 28 (see also FIGS. 12 and 13) and peripherally sealed thereto. Each bipolar electrode plate 28 used in each bipolar cell 12 of the battery 10 is composed of a partition sheet 36 (see also FIGS. 10 and 11) and a pair of bipolar electrode elements 38 (see also FIGS. 8 and 9) folded into a hairpin configuration and applied over opposite edges of the partition sheet 36 so as to cover opposite surfaces 40, 42 of adjacent halves 36A, 36B of the partition sheet 36.

Still further, each of the bipolar electrode elements 38 used in each bipolar electrode plate 28 of the battery 10 is composed of a woven grid 44 (see also FIGS. 2–6), an adhesive or hot-melt strip 46 (see also FIG. 7) applied to a central longitudinal region of the woven grid 44 along which the grid 44 is folded into the hairpin configuration, and layers of negative and positive active material pastes 48, 50 (see also FIG. 8) applied to respective halves 44A, 44B of the woven grid 44 on opposite sides of the central hot-melt strip 46. The grid 44 (see also FIGS. 2–6) used in each bipolar electrode element 38 of the battery 10 is a continuous "roving" weave employing transverse or T-strands 58 of a conductive yarn and longitudinal or L-strands 62 of a non-conductive yarn. (The L-strands may be conductive as the T-strands or may have "reduced conductivity", i.e. lead sheath may be of reduced thickness compared with T-strands.) The T-strand 58 of conductive yarn has a multi-stranded C glass core 56 surrounded and covered by an extruded lead sheath 52, whereas the L-strand 62 of non-conductive yarn has a multi-stranded C glass core 60 surrounded and covered by a thermal activated sizing 54.

FABRICATION OF QUASI-BIPOLAR BATTERY AND COMPONENTS THEREOF

In the method of fabricating the quasi-bipolar battery 10 and the respective components thereof, first, the bipolar electrode elements 38 to be used in the battery are fabricated. Next, the bipolar electrode elements 38 and partition sheets 36 are assembled into the bipolar electrode plates 28. Then, the bipolar electrode plates 28 and the separator plates 30 are assembled into the bipolar cells 12. Finally, the bipolar cells 12 are stacked and assembled with the monopolar end plates into the battery 10.

FABRICATION OF THE BIPOLAR ELECTRODE ELEMENTS

Referring to FIGS. 2–9, each of the bipolar electrode elements 38 of FIGS. 1 and 9 is fabricated by: first, applying the adhesive or hot-melt strip 46 to a central longitudinal region of the woven grid 44; second, applying the layers 48, 50 of negative and positive active material pastes to the respective halves 44A, 44B of the woven grid on opposite sides of the central hot-melt strip 46; and, third, folding the woven grid 44 along its centerline and the centerline of the central strip 46 into a hairpin configuration, as seen in FIG. 1 and 9.

More particularly, as seen in FIGS. 2–16, the grid 44 used by the bipolar electrode element 38 is a continuous "roving" weave employing T-strands 58 of lead glass yarn for the transverse weave and L-strands 62 of sized glass yarn for the longitudinal weave. By way of example, the core 56 of the T-strands 58 can have a 0.008 inch outside diameter, whereas the core 60 of the L-strands 62 can have a 0.005 inch outside diameter. The spacing between the centers of the T-strands 58 can be 0.10 inch. Standard weaving techniques can be used to produce the woven grid 44.

Non-lead glass yarn is employed for the L-strands 62 for three reasons: first, to reduce grid mass and volume (by not using lead on the L-strands) since longitudinal conductivity is not required; second, to minimize grid thickness; and third, to enable use of the thermally active sizing 54 to provide vertex locking between the T- and L-strands 52, 54 and thereby a more rugged grid structure.

Lead glass yarn, or fiberglass yarns having a high quality coaxial lead coating applied thereto, used for the T-strand 58 has been demonstrated to be well suited as a current collector for lead-acid systems. The material appears to have low corrosion rates, excellent interface behavior with both lead and lead-dioxide active materials, and excellent mechanical strength. However, lead yarn does not lend itself to direct application in conventional battery structures. Attempts to achieve grid structures in conventional battery structures are complicated by problems associated with mechanical and electrical termination. Due to the construction of the components in the quasi-bipolar battery 10, as will be clearly apparent hereinafter, these problems of mechanical and electrical termination are not present.

As variations to the above-described construction of the woven grid 44, special weaves may be employed to enhance active material locking and grid ruggedness. For example, L-strands may be paired and mutually locked; diagonal shear reinforcement strands may be added and occasional leaded L-strands may be added to compensate for T-strand corrosion.

Figure 7:
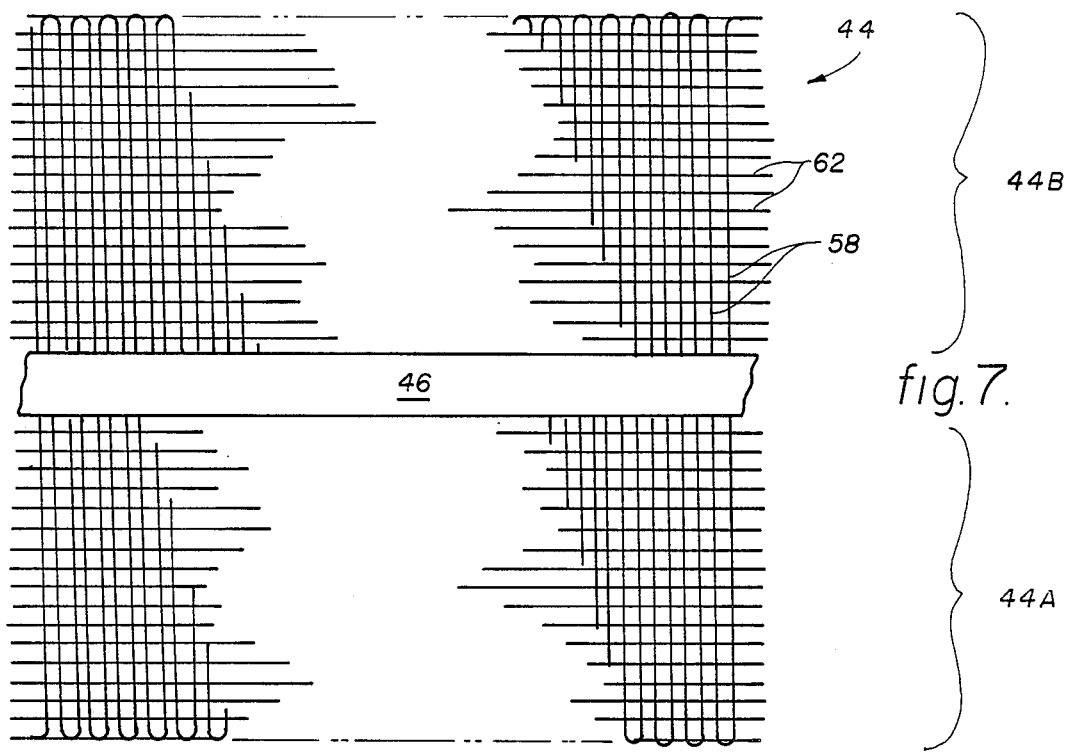
FIG. 7 is a plan view of the woven grid of FIG. 6 with a continuous hot-melt strip applied to a central longitudinal region of the woven grid.

As seen in FIG. 7, the central hot-melt strip 46 of the bipolar electrode element 38 is added to the woven grid 44 prior to pasting thereof. The central strip 46, upon folding, becomes an edge seal on the pair of opposite edges of the bipolar electrode plate 28 shown in FIGS. 1, 12 and 13. It also serves as an edge barrier for the respective negative and positive active paste layers 48, 50 on the halves 44A, 44B of the two folded grids 44, as seen in FIG. 1. By way of example, the central strip 46 can be 0.025 inch in thickness and 0.50 in width.

The preferred application technique to form the hot-melt strip 46 is to apply two continuous tapes to opposite faces of the woven grid 44, and then roll-press them into engagement with the grid and with one another through the empty spaces between the criss-crossed T- and L-strands 58, 62 at the central region of the grid 44. The tapes used for this purpose should contain plastic backings (not shown) which form protective surfaces which remain on the respective one exposed exterior surface of the tapes until the two bipolar electrode elements 38 are assembled over the partition sheet 36 to form the bipolar electrode plate 38, at which time the inner ones of the backings on the element 38 are removed, and until the separator plates 30 are assembled to the bipolar electrode plate 28 at which time outer ones of the backings on the element 38 of the paste 28 are removed.

It should be apparent that the tape backings serve to prevent unwarranted sticking of the hot-melt during subsequent processing while also providing a removable mask for active material flash once the active material has been applied to the woven grid 44. At moderate temperatures, the hot-melt material softens and will easily conform to the sandwiched T- and L-strands 58, 62 of the grid 44 while achieving a tight mutual bond. Sources for the hot-melt material are Imperial Adhesives of Cincinnati, Ohio and Quadrant Chemical of McKinney, Texas.

Both layers of negative and positive pastes 48, 50 of the bipolar electrode element 38 are applied simultaneously to the same side of the halves 44A, 44B of the woven grid 44 using conventional techniques and equipment, such as similar to those of expanded grid operations. Appropriate guides are used to insure proper channeling of the two paste materials. By controlling over-paste thickness of the positive material 40, optimal ratios between positive and negative material 50, 48 can be achieved. The over-pasting is desired since it adds corrosive protection for the positive grid. Furthermore, if required, the negative grid yarn can be squashed slightly during pasting to reduce the negative grid thickness. By way of example, the negative active material paste layer 48 can be 0.020 inch in thickness, whereas the positive active material paste layer 50 can be 0.025 inch in thickness.

Since ionic conductivity involves only the exterior side or faces of the bipolar electrode plate 28 employing two of the folded elements 38, only the outer exposed surfaces 48A, 50A of the negative and positive active material paste layers 48, 50 need be bare. The reverse or inner surfaces 48B, 50B of the layers 48, 50 may be backed with any desired material, without reducing electrical performance. By so doing, the handling characteristics of the pasted grids to be folded into bipolar electrode elements 38 may be improved; active material damage can be reduced and stack-handling facilitated. Backing candidates include porous materials such as paper products and non-porous materials such as polyethylene. Flash on the central strip 46 is automatically removed when the one central strip plastic backing is removed.

Figure 8:
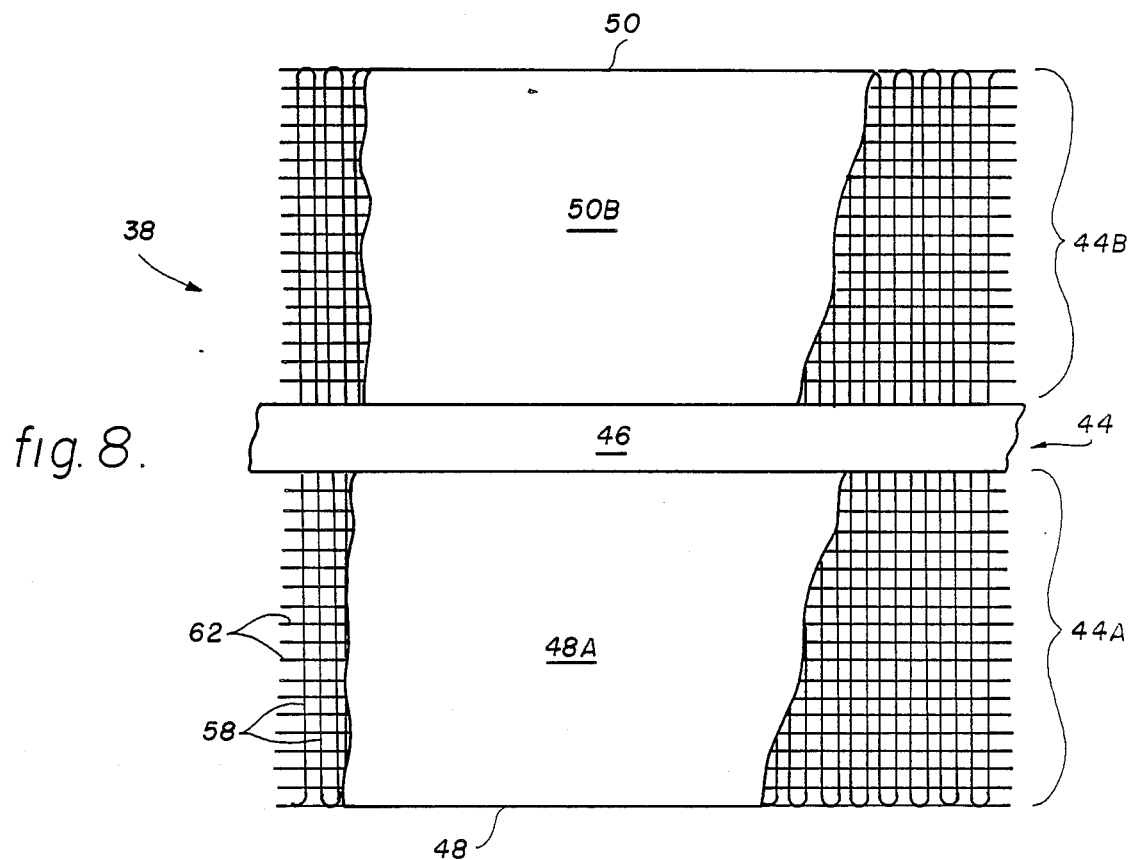
FIG. 8 is a plan view of a bipolar electrode element employed in the battery construction of FIG. 1, the electrode element being composed of the woven grid of FIG. 6 with the continuous hot-melt strip applied to the central longitudinal region of the woven grid as illustrated in FIG. 7 and also with layers of positive and negative active material pastes applied to upper and lower halves of the woven grid on opposite sides of the central hot-melt strip.

After pasting of the grid 44 to the form shown in FIG. 8 is completed, the continuous pasted grid is cut to the required lengths. These lengths are then handled and cured using conventional methods.

Finally, the last step in fabrication of the bipolar electrode element 38 is carried out by applying a centerline fold to the pasted grid to form the grid into the hairpin configuration shown in FIG. 1. The fold will remain through formation and final assembly. The folded bipolar electrode elements 38 are then hung over partitions 64 of a bipolar formation tank 66, as shown in FIG. 9.

Unlike monopolar processing, no electrical connections are required for the grids 44 used in the bipolar cells 12 of the quasi-bipolar battery 10. Conventional formation techniques using 1.050 density acid are then performed. The formed bipolar electrode elements 38 are then washed and dried in an oxygen-free environment. Alternatively, in situ formation may be employed when unformed bipolar cells are stacked, electrolyte-loaded and then formed.

FABRICATION OF THE BIPOLAR ELECTRODE PLATES

Referring to FIGS. 10–13, each bipolar electrode plate 28 of FIGS. 1, 12 and 13 is assembled by: first, performing the above-described steps in fabricating each of a pair of the bipolar electrode elements 38; and, second, applying the pair of the bipolar electrode elements 38 over opposite edges 68, 70 of the partition sheet 36, seen in FIGS. 10 and 11, so as to cover the opposite surfaces of adjacent halves 36A, 36B of the partition sheet 36, as seen in FIGS. 1 and 12.

More particularly, as seen in FIGS. 10 and 11, the partition sheet 36 used by the bipolar electrode plate 28 is a thin polyethylene sheet 72 having strips 74 of hot-melt adhesive molded over its lateral ends. By way of example, the polyethylene sheet 72 can be 0.005 inch in thickness and 6.25 x 9.75 inches in size. The strips 74 can be 0.250 inch in width and 0.05 inch in thickness. Prior to application of the bipolar electrode elements 38 over the opposite edges 68, 70 of the partition sheet 36, the plastic backing (not shown) covering the inner radius of the central strips 46 must be removed; this may require partial opening (unfolding) of the fold.

After removal of the inner backings, the bipolar elements 38 are then applied or inserted over the partition sheet edges 68, 70 to the positions shown in FIGS. 1 and 12, such that the outer exposed surfaces 48A of the end-to-end negative layers 48 of the two hairpin folded elements 38 form one external face of the constructed bipolar electrode plate 28 and the outer exposed surfaces 50A of the end-to-end positive layers 50 (not seen in FIG. 12) form the other external face of the plate 28. The folded hot-melt edges of the elements 38 are then press-rolled to achieve bonding with the edges 68, 70 of the partition sheet 36. If backings were included on the inner covered surfaces 48B, 50B negative and positive layers 48, 50 bonding between the backings (not shown) and the partition 36 may be employed to improve handling characteristics of the composite assembly or bipolar electrode plate 28.

FABRICATION OF THE BIPOLAR CELLS

Figure 16:
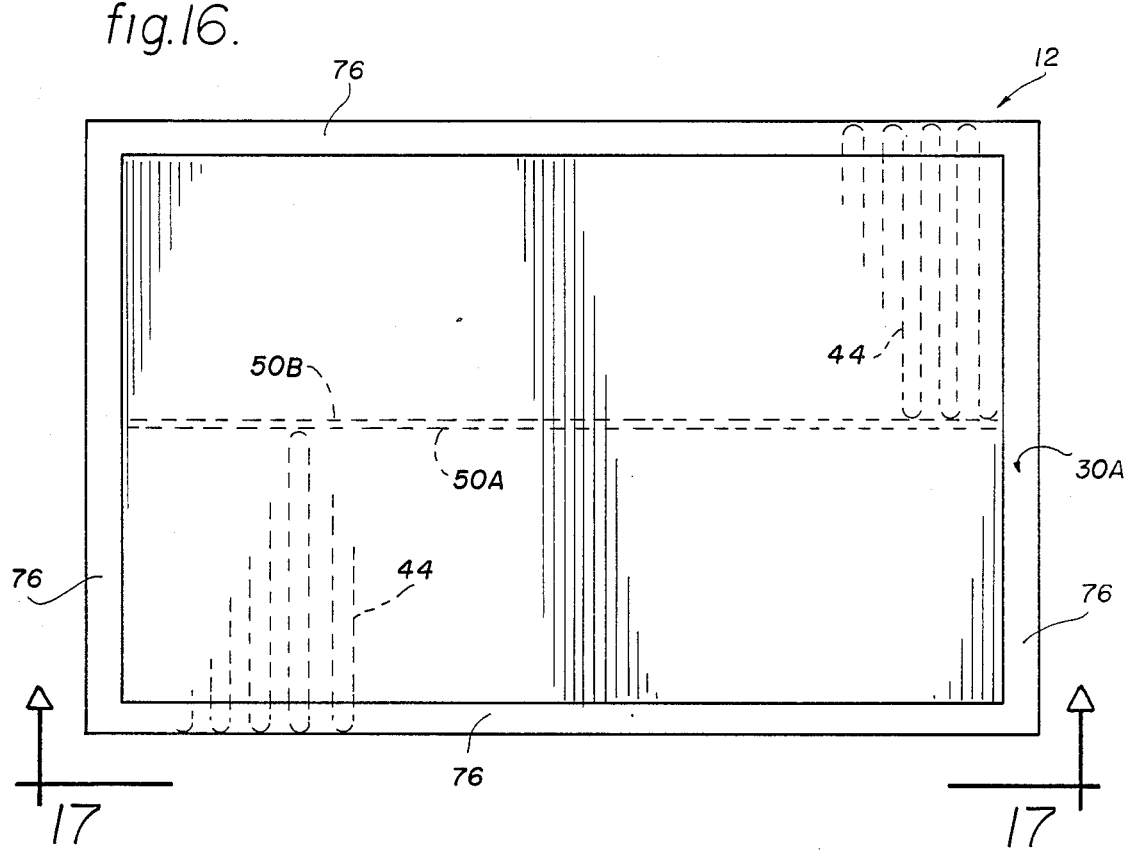
FIG. 16 is a plan view of a bipolar cell employed in the battery construction of FIG. 1, the bipolar cell being composed of the bipolar electrode plate of FIG. 12 and a pair of the separator plates of FIG. 15 disposed on opposite sides of the electrode plate and peripherally sealed thereto at respective hot-melt borders and strips thereof.
Figure 17:
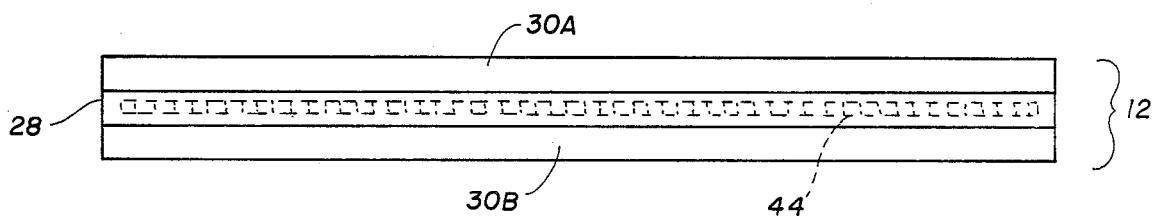
FIG. 17 is a bottom end view of the bipolar cell as seen along line 17—17 of FIG. 16.

Referring to FIGS. 14–17, each bipolar cell 12 of Figs. 1, 16 and 17 is assembled by: first, performing the above-described steps in fabricating the bipolar electrode plate 28; and, second, applying and peripherally sealing a pair of separator plates (one of which is seen in FIGS. 14 and 15) to opposite sides 32, 34 of the plate 28 to provide the bipolar cell 12, as seen in FIGS. 1, 16 and 17.

More particularly, as seen in FIGS. 14 and 15, each of the two separator plates 30 used by the bipolar cell 12 is a Dexter-type glass mat separator. By way of example, the plate 30 can be the same size as the partition sheet 36 and 0.023 inch in thickness at 5 psi compression. One separator plate 30A covers the outer exposed surfaces 48A of the negative layers 48 on one face of the bipolar electrode plate 38, whereas the other separator plate 30B covers the outer exposed surface 50A of the positive layers 50 on the other face of the plate 38. By using two separator plates 30A, 30B (each half thickness), both the positive and negative faces of the plate 38 are secured for subsequent handling.

Prior to assembly, separator plate borders 76, as seen in FIGS. 1, 15 and 16, are impregnated with hot-melt adhesive. By way of example, the border 76 can be 0.25 inch in width. Borders 76 thusly prepared will prevent electrolyte leakage and unwanted cell to cell ionic paths while achieving a mechanical bond with the bipolar electrode plate 38. With each separator plate 30, a small vent tube 78 is included within one of the hot-melt borders 76 to allow gas venting. In order to minimize leakage currents, sequential separator plates 30 should be oriented such that the vent tubes 78 do not align.

Thereafter, the pair of prepared separator plates 30A, B are then stacked with one bipolar electrode plate 28. The hot-melt impregnated borders 76 of the separator plates 30A, 30B are then press-rolled to achieve bonding with the periphery of the plate 38. The resulting bipolar cell 12 is then ready for electrolyte loading and final stack assembly. By way of example, the bipolar cell 12 has a thickness of 0.096 inch (each separator plate 30 being 0.023 inch in thickness and the plate 38 being 0.050 inch in thickness).

FABRICATION OF THE QUASI-BIPOLAR BATTERY

Referring to FIGS. 1 and 18-20, the quasi-bipolar battery 10 is assembled by: first performing the above-described steps in fabricating the bipolar cells 12; second, loading the bipolar cells 12 with an electrolyte; third, placing the bipolar cells 12 in the stack 14 thereof; fourth, applying the pair of monopolar plates 16 at opposite ends of the stack 14 of bipolar cells 12; and, finally, enclosing the bipolar cell stack 14 and pair of monopolar plates 16 in the battery housing 18.

More particularly, unlike in conventional flooded battery designs, the case 20 and lid 22 of the housing 18 do not provide electrolyte seals. That function is performed exclusively the hot-melt as described above. The case 20 and lid 22, however, each perform four crucial functions which include gas containment, axial compression, heat transfer, and mechanical integrity.

Based on experimental data, the case 20 and lid 22 of the battery housing 18 must be capable of withstanding the maximum anticipated change of gas pressure of nearly 6 psi being the difference between a maximum pressure of less than 6 psi produced by an overcharge condition generated during recharge and a minimum pressure of less than 1 psi generated during stand periods. If air is not removed prior to final sealing of the housing 18, the walls of the case 20 will experience pressures which range between +3 psi during overcharge and −3 psi during stand. If, however, a partial vacuum is established during assembly, negative gauge pressures can be maintained at all times. This, in turn, should reduce case and lid structural requirements since negative pressures can be supported by the stack and do not require case and lid stiffness.

Further, based on limited data, it appears that the optimal stack compression force is on the order of 5 psi. (As pressure is increased, plate life increases while separator performance degrades.) Using the above numbers, it appears that an efficient design could be achieved if an initial gauge pressure of −6 psi were established. This would provide wall pressures which would range between −8 psi an −2 psi with lid and case total pressures ranging between −3 psi and +3 psi during normal operation. It would also enable the use of a simple pressure release valve 80 which could operate over a pressure range of about +0.5 psi to +1.0 psi. Pressure relief would occur during abnormal conditions of overcharge only. Another advantage of the design is that the lid to case epoxy seal would normally be under compression and experience only small shear and tensile forces during recharge and abnormal conditions.

Case and lid design would be determined by the +1.0 psi worse case abnormal condition. The case wall forces would be +1.0 psi and the case bottom and lid forces would be +6 psi in worst case condition. Only shallow ribs 82 of about ⅛ inch are required to stiffen the 6 inch high case walls 84 against the +1.0 psi. Both the lid 22 and case bottom 86 (each has a 7 inch span) would require ½ inch deep ribs 88 to achieve adequate stiffness against the +6 psi.

The present design is based on a "golf cart" battery footprint (10.5 x 7.1 inches). It appears that the battery length could be increased with some advantage. First, with increased length, none of the case ribbing would have to be increased. Furthermore, since heat flow is to the top and bottom surfaces, increasing length would have no thermal impact. Increasing length would, however, reduce dead weights associated with both the case ends and the hot-melt seals. (It would also reduce cost since fewer cells would be used per unit energy storage.) For example, with length doubled from 10.5 inch to 21 inch, the dead weight fraction is estimated to drop from 29.34% to 27.17%. This, in turn, would produce an energy density gain of 3.07%.

Figure 18:
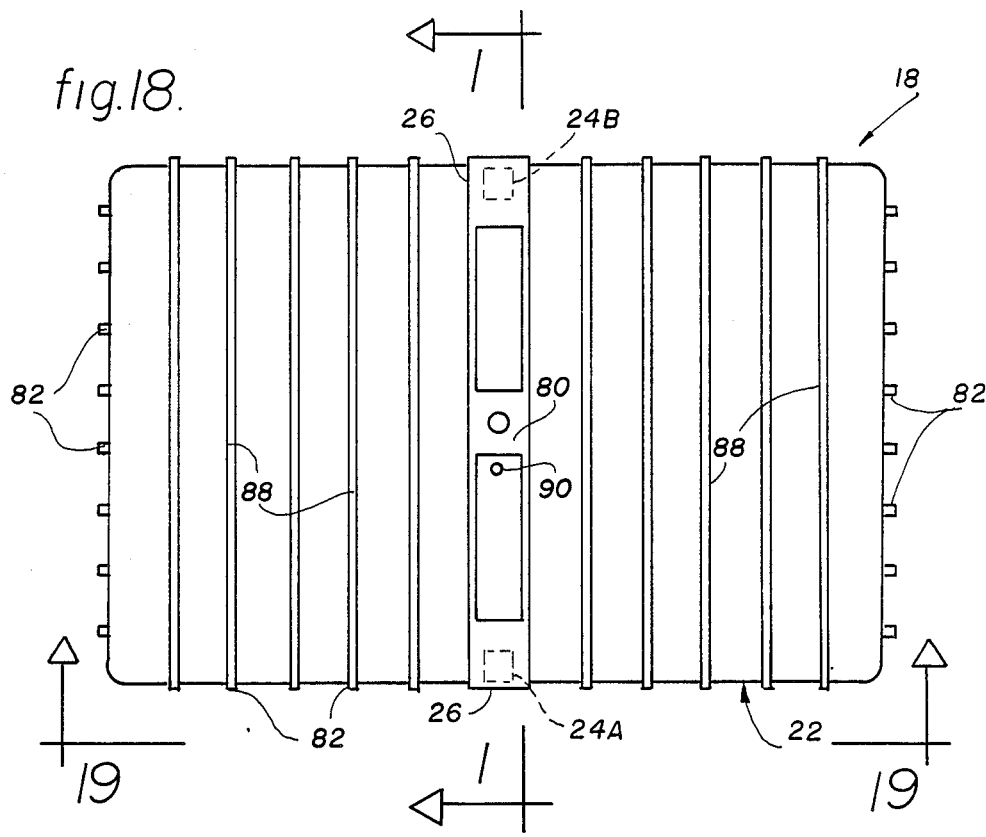
FIG. 18 is a top plan view of a housing employed in the battery construction of FIG. 1, the battery housing having a case and a lid sealed thereon.
Figure 19:
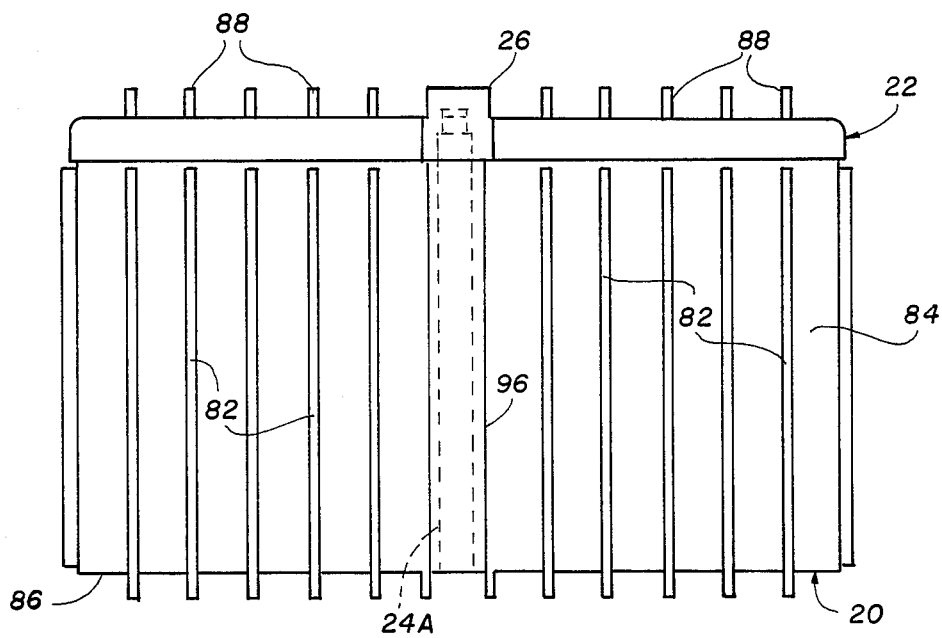
FIG. 19 is a side elevational view of the battery housing as seen along line 19—19 of FIG. 18.

As shown in FIGS. 18 and 19, a vertical channel 88 is integrated into the structure of the case 20 to accommodate the one of the lead buses 24 which connects between the bottom one of the monopolar end plates 16 and the one external connector 26 on the lid 22. Other mechanical features include the single pressure relief valve 80 and a vacuum pumping port 90, both being integrated with the lid structure. Finally, the reinforcement ribs 82, 88 should be designed and placed such that both vertical and horizontal "lock-stacking" of the batteries is facilitated.

The monopolar end plates 16 and lead buses 24 used in the design are conventional. Excess active material (not shown) is used in each end plate to ensure adequate life despite the use of a non-reinforced conventional grid (not shown) in the end plate. Current transfer to the respective external lid-mounted connectors 26 is via the lead buses 24 which connect between tabs 92 extending from the grids (not shown) of the end plates 16 and the respective connectors 26. The buses 24 are of relatively small cross-section due to the high voltage, low current output of the battery.

Figure 20:
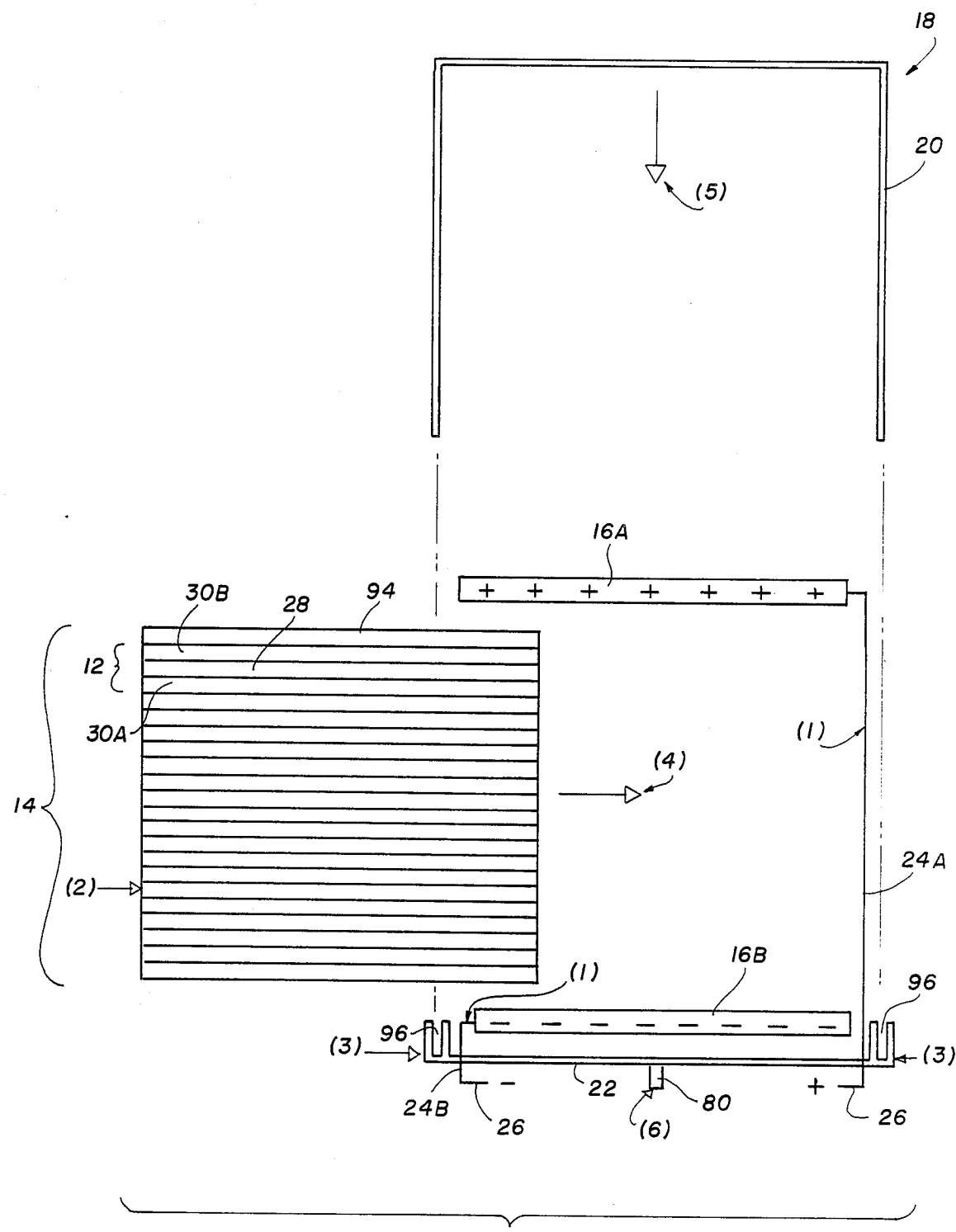
FIG. 20 is a schematic representation of the steps involved in assembling of the parts of the battery.

Turning now to FIG. 20, there is shown schematically the steps involved in final assembly of the battery 10, namely: loading electrolyte to each of the bipolar cells 12, stacking of the bipolar cells 12 with the monopolar end plates 16, electrically connecting the end plates 16 with the connectors 26, and inclusion into the housing 18 and sealing the lid 22 to the case 20 thereof. In order to successfully execute the above steps, several technical items must be addressed: first, a controlled amount of electrolyte must be added to each bipolar cell 12; second, upon addition of electrolyte, negative plates will self-discharge unless fully flooded (self-discharge over a few minutes is acceptable, however); and, third, a mechanical force of roughly five pounds per square inch of footprint will be required to compress the stack (axial pressure requirement); accordingly, a total force of about 400 pounds will be required to force the lid in place.

In view of the above constraints, the following procedures are used in final assembly (with the steps being identified in FIG. 20 by the respective number of the step in parenthesis):

Step (1): Weld positive and negative buses 24A, 24B between the dry charged positive and negative monopolar end plates 16A, 16B and the connectors 26 located in the lid 22. The lid 22 should be inverted since it will serve as the base for the bipolar cell stack 14 during assembly.

Step (2): Load measured amounts of electrolyte into the regions of the positive separator plate 30A of each bipolar cell 12. Keep the negative separator plate 30B of each bipolar cell 12 dry prior to actual stacking of the cells 21 (the uncompressed separator plates 30A on the positive side should have adequate storage capacity; if not, separator material can be transferred from the negative to the positive side). Also, load the required electrolyte into the bottom positive monopolar end plate 16 and its adjoining separator plate 94.

Step (3): Apply battery epoxy to the channel 96 defined in the lid 22 of the housing 18.

Step (4): Stack the bipolar cells 12 between the monopolar end plates 16 using the lid 22 as the stacking base.

Step (5): Using the needed compression force, lower the case 20 over the stack 14 and seat edges into the lid epoxy.

Step (6): Provide an 8 psi partial vacuum to the housing 18. This will serve to reduce the internal oxygen and, hence, reduce self-discharge of the negatives. It will also obviate the need for external compression forces while the epoxy hardens.

Other Considerations and Factors

For performance equivalent to that of conventional designs, plate thicknesses of the quasi-bipolar design herein are half those of the conventional designs since only one face supports ionic conductivity. This, in turn, means that thinner diameter lead glass yarn must be used which, in turn, means shorter corrosion life. By using thin, non-leaded L-strands, the thickness reduction can be minimized — a 30% reduction may suffice.

A positive consideration is that the quasi-bipolar design herein deletes the need for current collecting frames and bonding between lead wires and frames, thus eliminating the associated failure mechanisms. Furthermore, analysis reveals that the quasi-bipolar current collecting structure is up to eight times more efficient than conventional designs in terms of electronic conductivity per unit mass of conductor.

As mentioned above and previously, plate thicknesses must be half those of conventional designs in order to achieve equivalent performance. This adds demands at each level of fabrication — pasting, curing, forming, handling and assembly. It also is a known negative in terms of life with respect to shedding and interface mechanisms. These life weaknesses, however, may be compensated for by the transverse containment provided by the grid fiberglass and by the axial containment provided by the application of external compression forces.

On the plus side, low-cost, continuous-mode pasting is employed and ease of pasting is expected since grid tensile strength is extremely high due to the fiberglass yarn. In addition, if backing is applied, added ruggedness should result. Additional design pluses include ease of formation (no grid connections) and ease of pressure containment (no straps to interfere with compression).

Some other advantages of the quasi-bipolar battery design herein include (some may have been mentioned earlier): (1) inherent high voltage (20 volts per inch of stack height typical); (2) maintenance-free operation; (3) absence of gas and aerosol emissions; (4) operation in any orientation; (5) high specific energy and power; (6) high mass density (low volume); (7) single pressure relief vent; (8) insensitivity to vibration and g-force; (9) immobilized electrolyte (no free acid if structurally damaged); (10) improved life due to efficient axial pressure containment and absence of non-lead metals; (11) efficient heat transfer to top and bottom surfaces; and (12) stackability.

Dimensions cited heretofore with respect to component illustrated in the FIGURES of the drawings are, as was stated above, by way of example only and correspond to a point design believed capable of achieving 60Wh/kg at C/3 and 300 W/kg at 80% DOD.

A component mass analysis was carried out for the point design represented in the FIGURES of the drawings. Results are listed in Table 1. The total inactive mass fraction is only 29% which compares with roughly 40% for conventional designs. This gives a specific energy of 1.01 Wh/kg per percent of positive plate utilization; at 58% positive utilization (0.13 AH/g) the corresponding specific energy is 58.6 WH/kg. This corresponds to a total capacity of 5.72 AH.

TABLE 1
Mass-Breakdown of Point Design

| Item | Mass Density (g/cm$^3$) | Total Volume (cm$^3$) | Total Mass (g) |
|---|---|---|---|
| Positive Active Material (0.025" bipolar plates, 0.050" end plates) | 4.27 | 619 | 2642 |
| Negative Active Material (0.020" bipolar plates 0.040" end plates) | 4.80 | 486 | 2333 |
| Electrolyte (1.300 density acid) | 1.30 | 2574 | 3350 |
| TOTAL ACTIVE MATERIALS | — | — | 8325 |
| Woven Bipolar Grids | 8.06 | 98.3 | 791 |
| End Plate Grids | 11.2 | 5.9 | 66 |
| End Plate Buses | 11.2 | 1.3 | 14 |
| Cell Partition Sheets (.005" P.E.) | 1.5 | 294 | 441 |
| Glass Mat Separators (0.046" per cell) | 0.20 | 2800 | 560 |
| Hot-Melt Sealant | 1.3 | 587 | 763 |
| Connector | — | — | 25 |
| Case and Lid plus epoxy seal | 1.9 | 410 | 779 |
| TOTAL INACTIVE MATERIAL | — | — | 3439 |
| TOTAL BATTERY | 1.8 | 6433* | 11,764 |

*Based on external dimensions of 7.12" × 10.5" × 5.25"

It is to be realized that only preferred embodiments of the invention have been described and that numerous substitutions, modifications and alterations are permissible without departing from the spirit and scope of the invention as defined in the following claims.

We claim:

1. In a bipolar battery construction, the combination comprising:
   a plurality of bipolar cells disposed in side-by-side relation to form a stack of said cells;

said each bipolar cell being loaded with an electrolyte and composed of a bipolar electrode plate and a pair of separator plates disposed on opposite sides of said electrode plate;

said bipolar electrode plate of each cell being composed of a partition sheet and a pair of bipolar electrode elements folded into a hairpin configuration and applied over opposite edges of said partition sheet so as to cover opposite surfaces of adjacent halves of said partition sheet;

said partition sheet and electrode elements of said electrode plate of each cell together defining a peripheral border portion about said electrode plate containing sealable means, said pair of separator plates each cell having respective peripheral border portions containing sealable means bonded directly to said sealable means on said peripheral border portion of said electrode plate to form each of said cells in said stack thereof as an individual self-contained sealed unit separate from one another.

2. The battery construction of claim 1 wherein each of said bipolar electrode elements includes:
a woven grid;
a hot-melt strip defining the part of said electrode plate peripheral border on said electrode element containing said sealable means, said strip being applied to a central longitudinal region of said woven grid along which said grid is folded into said hairpin configuration precedent to application to said partition sheet; and
layers of negative and positive active materials applied to respective halves of said woven grid on opposite sides of said central hot-melt strip.

3. The battery construction of claim 2 wherein said woven grid includes:
strands of a conductive yarn composing the transverse weaves of said grid; and
strands of a conductive or a non-conductive yarn composing the longitudinal weaves of said grid.

4. The battery construction of claim 3 wherein said conductive yarn has a multi-stranded glass core surrounded and covered by a lead sheath.

5. The battery construction of claim 4 wherein said longitudinal strands comprise a non-conductive yarn having a multi-stranded glass core surrounded and covered by a thermally activated sizing or a multi-stranded glass core surrounded and covered by a lead sheath thinner than the sheath on the transverse strands.

6. The battery construction of claim 1 further comprising:
a pair of monopolar plates disposed at opposite ends of said stack of bipolar cells.

7. The battery construction of claim 6 further comprising:
a housing including a case and a lid sealing said case, said housing containing said stack of bipolar cells and said monopolar plates disposed at said stack opposite ends.

8. In a bipolar battery construction, the combination comprising:
a housing composed of a case and a lid sealing said case;
a plurality of bipolar cells disposed in side-by-side relation to form a stack of said cells;
a pair of monopolar plates disposed at opposite ends of said stack, said monopolar plates and said stack being contained in said housing;

said each bipolar cell being loaded with an electrolyte and composed of a bipolar electrode plate and a pair of separator plates disposed on opposite sides of said electrode plate;

each said bipolar electrode plate of each cell being composed of a partition sheet and a pair of bipolar electrode elements folded into a hairpin configuration and applied over opposite edges of said partition sheet so as to cover opposite surfaces of adjacent halves of said partition sheet;

said partition sheet and electrode elements of said electrode plate of each cell together defining a peripheral border portion about said electrode plate containing sealable means, said pair of separator plates of each cell having respective peripheral border portions containing sealable means bonded directly to said sealable means on said peripheral border portion of said electrode plate to form each of said cells in said stack thereof as an individual self-contained sealed unit separate from one another;

said bipolar electrode element of each cell being composed of a woven grid, a hot-melt strip defining the part of said electrode plate peripheral border on said electrode element containing said sealable means, said strip being applied to a central longitudinal region of said woven grid along which said grid is folded into said hairpin configuration precedent to application to said partition sheet, and layers of negative and positive active materials applied to respective halves of said woven grid on opposite sides of said central hot-melt strip.

9. The battery construction of claim 8 wherein said woven grid includes:
strands of a conductive yarn composing the transverse weaves of said grid; and
strands of a non-conductive or conductive yarn composing the longitudinal weaves of said grid.

10. The battery construction of claim 9 wherein said conductive yarn has a multi-stranded glass core surrounded and covered by a lead sheath.

11. The battery construction of claim 9 wherein said non-conductive yarn has a multi-stranded glass core surrounded and covered by a thermal activated sizing.

12. A bipolar cell construction, comprising:
a bipolar electrode plate;
a pair of separator plates disposed on opposite sides of said electrode plate;
said bipolar electrode plate being composed of a partition sheet and a pair of bipolar electrode elements folded into a hairpin configuration and applied over opposite edges of said partition sheet so as to cover opposite surfaces of adjacent halves thereof;
said partition sheet and electrode elements of said electrode plate together defining a peripheral border portion about said electrode plate containing sealable means, said pair of separator plates having respective peripheral border portions containing sealable means bonded directly to said sealable means on said peripheral border portion of said electrode plate to form said cell as an individual self-contained sealed unit.

13. The cell construction of claim 12 wherein each of said bipolar electrode elements includes:
a woven grid;
a hot-melt strip defining the part of said electrode plate peripheral portion on said electrode element containing said sealable means, said strip being applied to a central longitudinal region of said woven grid along which said grid is folded into said hairpin configuration precedent to application to said partition sheet; and layers of negative and positive active materials applied to respective halves of said woven grid on opposite sides of said central hot-melt strip.

14. The cell construction of claim 13 wherein said woven grid includes;

strands of a conductive yarn composing the transverse weaves of said grid; and strands of a conductive or non-conductive yarn composing the longitudinal weaves of said grid.

15. The cell construction of claim 14 wherein said conductive yarn has a multi-stranded glass core surrounded and covered by a lead sheath.

16. The cell construction of claim 14 wherein said conductive or non-conductive yarn has a multi-stranded glass core surrounded and covered by a thermal activated sizing.

17. A bipolar electrode plate construction, comprising:

a partition sheet having a pair of opposite lateral edges and a pair of opposite end edges, said sheet including adhesive strips applied over said lateral edges; and a pair of bipolar electrode elements folded into a hairpin configuration and applied over said opposite end edges of said partition sheet so as to cover opposite surfaces of adjacent halves of said partition sheet;

said each bipolar electrode element being composed of a woven grid, an adhesive strip applied to a central longitudinal region of said woven grid along which said grid is folded into said hairpin configuration precedent to application to said partition sheet, and layers of negative and positive active material pastes applied to respective halves of said woven grid on opposite sides of said central strip;

said adhesive strips on said partition sheet together with said adhesive strips on said folded electrode elements forming a sealable peripheral border about said electrode plate.

18. The plate construction of claim 17 wherein said woven grid includes:

strands of a conductive yarn composing the transverse weaves of said grid; and strands of a non-conductive or conductive yarn composing the longitudinal weaves of said grid.

19. The plate construction of claim 18 wherein said conductive yarn has a multi-stranded glass core surrounded and covered by a lead sheath.

20. The plate construction of claim 18 wherein said non-conductive yarn has a multi-stranded glass core surrounded and covered by a thermally activated sizing.

21. A bipolar electrode element, comprising:

a woven grid including strands of a conductive yarn composing the transverse weaves of said grid; and strands of a non-conductive yarn composing the longitudinal weaves of said grid, said non-conductive yarn has a multi-stranded glass core surrounded and covered by a thermal activated sizing;

a hot-melt strip applied to a central longitudinal region of said woven grid along which said grid is folded into a hairpin configuration; and layers of negative and positive active material pastes applied to respective halves of said woven grid on opposite sides of said central hot-melt strip.

22. The element construction of claim 21 wherein said conductive yarn has a multi-stranded glass core surrounded and covered by a lead sheath.

* * * * *

UNITED STATES PATENT AND TRADEMARK OFFICE
CERTIFICATE OF CORRECTION

PATENT NO. : 4,874,681

DATED : October 17, 1989

INVENTOR(S) : Wally E. Rippel, Dean B. Edwards

It is certified that error appears in the above-identified patent and that said Letters Patent is hereby corrected as shown below:

On the title page, item [76] Inventor: should read as follows:

--[75] Inventors: Wally E. Rippel, Altadena, Calif.;
Dean B. Edwards, Moscow, Idaho--.

On the title page, please insert the following:

--[73] Assignee: California Institute of Technology,
Pasadena, Calif.--.

Abstract, line 3, change "monoplanar" to --monopolar--.
line 14, change "comprised" to --composed--.

Col. 6, line 14, change "2-16" to --2-6--.

Col. 9, line 18, change "B" to --30B--.
line 42, before "the" add --by--.

Col. 11, line 11, after "dry: add -- - --.

Col. 12, line 32, change "WH/kg" to --Wh/kg--.

UNITED STATES PATENT AND TRADEMARK OFFICE
CERTIFICATE OF CORRECTION

PATENT NO. : 4,874,681

DATED : October 17, 1989

INVENTOR(S) : Wally E. Rippel, Dean B. Edwards

It is certified that error appears in the above-identified patent and that said Letters Patent is hereby corrected as shown below:

Col. 15, line 9, change ";" to --:--.

Signed and Sealed this

Eighth Day of December, 1992

Attest:

DOUGLAS B. COMER

Attesting Officer

Acting Commissioner of Patents and Trademarks